(12) United States Patent
Scozzola (10) Patent No.: US 10,817,461 B2
(45) Date of Patent: Oct. 27, 2020

(54) DISTRIBUTED MICROCONTROLLER

(71) Applicant: STMicroelectronics (Grenoble 2) SAS, Grenoble (FR)

(72) Inventor: Giovanni Scozzola, Saint Egreve (FR)

(73) Assignee: STMICROELECTRONICS (GRENOBLE 2) SAS, Grenoble (FR)

(*) Notice: Subject to any disclaimer, the term of this patent is extended or adjusted under 35 U.S.C. 154(b) by 0 days.

(21) Appl. No.: 16/530,069

(22) Filed: Aug. 2, 2019

(65) Prior Publication Data
US 2020/0050579 A1 Feb. 13, 2020

(30) Foreign Application Priority Data
Aug. 10, 2018 (FR) ...................... 18 57433

(51) Int. Cl.
| H04N 1/00 | (2006.01) |
| G06F 1/00 | (2006.01) |
| H04B 1/38 | (2015.01) |
| G06F 15/78 | (2006.01) |
| G06F 13/42 | (2006.01) |

(52) U.S. Cl.
CPC .............. G06F 15/78 (2013.01); G06F 13/42 (2013.01)

(58) Field of Classification Search
CPC ....... G06F 15/78; G06F 15/7842; G06F 13/42
See application file for complete search history.

(56) References Cited

U.S. PATENT DOCUMENTS 7,840,188 B2 * 11/2010 Kurokawa .......... G06F 15/7832
713/320
2006/0211449 A1 9/2006 Haque et al.

FOREIGN PATENT DOCUMENTS

WO 2013089736 A1 6/2013

* cited by examiner

*Primary Examiner* — Kenneth B Wells
(74) *Attorney, Agent, or Firm* — Slater Matsil, LLP (57) ABSTRACT

A microcontroller includes distinct electronic functions and an interconnection circuit capable of transmitting in wireless fashion data between the functions. The microcontroller can be operated by writing configuration characteristics into a memory of the interconnection circuit for electronic functional circuits that do not have configuration characteristics contained in the memory and erasing configuration characteristics from the memory for electronic functional circuits that have configuration characteristics contained in the memory but are determined to not be able to wirelessly communicate with the interconnection circuit. Data can be wirelessly transmitted between the interconnection circuit and electronic functional circuits having configuration characteristics contained in the memory.

21 Claims, 6 Drawing Sheets

DISTRIBUTED MICROCONTROLLER

CROSS-REFERENCE TO RELATED APPLICATIONS

This application claims priority to French Patent Application No. 1857433, filed on Aug. 10, 2018, which application is hereby incorporated herein by reference.

TECHNICAL FIELD

The present disclosure concerns microcontrollers and, in particular embodiments, the interconnections of the different functions of a microcontroller.

BACKGROUND

A microcontroller generally is an integrated circuit which gathers the essential electronic functions of a computer, for example: central processing unit or processor, memories (ROM and RAM), and input-output interfaces. The different electronic functions of a microcontroller are generally connected to one another via a bus.

The different interconnects within a microcontroller are formed in wired fashion. Thus, the positioning of the different functions is limited by such interconnects.

Further, the number of functions is limited to the functions integrated on manufacturing of the microcontroller.

SUMMARY

An embodiment overcomes all or part of the disadvantages of usual microcontrollers.

An embodiment provides a microcontroller comprising distinct electronic functions and an interconnection circuit capable of transmitting, in wireless fashion, data between the functions.

According to an embodiment, at least one function comprises a central processing unit and at least one function comprises a memory.

According to an embodiment, the different electronic functions are not interconnected by a wire connection.

According to an embodiment, an electronic function comprises an input/output interface.

According to an embodiment, the input/output interface comprises wire connections with peripherals.

According to an embodiment, the interconnection circuit is a Wi-Fi router.

According to an embodiment, the interconnection circuit comprises a central processing unit, a router, a memory, and a data transmit/receive circuit.

According to an embodiment, a usage mode comprises the steps of: determining the electronic functions which are present; if electronic functions which do not have their configuration characteristics contained in the memory are present, writing their configuration characteristics into the memory of the interconnection circuit; and if electronic functions having their configuration characteristics contained in the memory are absent, erasing their configuration characteristics from the memory of the interconnection circuit.

According to an embodiment, these steps are periodically carried out during the operation of the microcontroller.

According to an embodiment, the period is in the range from approximately 1 ms to approximately 10 s.

According to an embodiment, the usage mode comprises the steps of: determining a program to be executed; determining the electronic functions used by the program; determining whether these electronic functions are available; making these electronic functions inaccessible to other programs; establishing a wireless connection between the electronic functions; and executing the program.

According to an embodiment, each electronic function comprises a data transmit/receive circuit.

According to an embodiment, the interconnection circuit is capable of detecting the addition and/or the removal of electronic functions to and/or from the microcontroller.

According to an embodiment, the interconnection circuit and at least some of the electronic functions are powered in wireless fashion.

The foregoing and other features and advantages will be discussed in detail in the following non-limiting description of specific embodiments in connection with the accompanying drawings.

DETAILED DESCRIPTION OF ILLUSTRATIVE EMBODIMENTS

The same elements have been designated with the same reference numerals in the different drawings. For clarity, only those steps and elements which are useful to the understanding of the described embodiments have been shown and are detailed.

The terms "approximately," "about," "substantially," and "on the order of" are used herein to designate a tolerance of plus or minus 10%, preferably of plus or minus 5%, of the value in question.

Unless otherwise specified, when reference is made to two elements connected together, this means that the elements are directly connected with no intermediate element other than conductors, and when reference is made to two elements coupled together, this means that the two elements may be directly coupled (connected) or coupled via one or a plurality of other elements.

System-on-chip (SOC) devices can include radio circuits in the chip. As such, a connected object can include a microcontroller with capacity to process information and a radio circuit. This combination is able to send data with very low power consumption. As disclosed herein, functional circuits that include radio capability can be implemented to benefit both manufacturers and the users.

Figure 1:
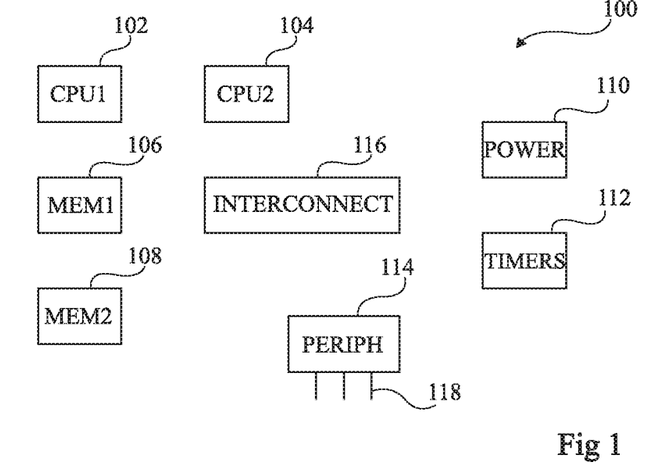
FIG. 1 schematically illustrates an embodiment of a microcontroller.

FIG. 1 schematically illustrates an embodiment of a microcontroller 100.

Microcontroller 100 comprises, in the present example, seven distinct electronic functions and one interconnection circuit 116 (INTERCONNECT). More particularly, the functions here comprise two central processing units 102 (CPU1) and 104 (CPU2), two memories 106 (MEM1) and 108 (MEM2), one power supply circuit 110 (POWER), clocks 112 (TIMERS), and one input/output interface 114 (PERIPH).

In practice, microcontroller 100 may comprise any number of electronic functions, including at least one data processing unit and at least one memory.

In practice, microcontroller 100 may comprise any number of electronic functions, provided to have at least one data processing unit and at least one memory.

Interconnection circuit 116 is capable of transmitting, in wireless fashion, data between different electronic functions of microcontroller 100. Data means any required signals, be they addresses, actual data, or control signals. Each electronic function of the microcontroller thus comprises a circuit capable of receiving and of transmitting data. Such transmit/receive circuits enable to establish a wireless connection between the different functions, via the interconnection circuit, and are for example compatible with one another.

Power supply circuit 110 is for example a wireless power supply circuit. The different electronic functions capable of forming part of the microcontroller are then capable of being powered by such a power supply circuit 110.

Memories 106 and 108 are, for example, volatile or non-volatile memories.

Input/output interface 114 is a circuit forming an interface between peripherals, not shown, and microcontroller 100. The peripherals are for example coupled to interface 114 by wire connections 118. Data can thus be transmitted between the peripherals and microcontroller 100 via a wire connection, between the peripherals and interface 114, and via a wireless connection, between interface 114 and the functions internal to microcontroller 100.

Figure 2:
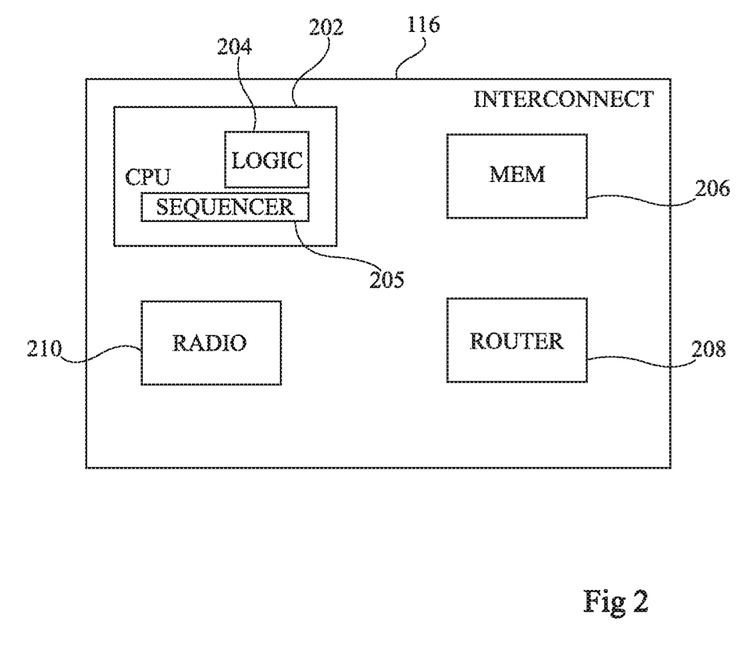
FIG. 2 illustrates electronic functional circuits used with an embodiment.

Each of the electronic functions can be a separately packed integrated circuit chip. With wireless power and communications, the chip does not need pins, which will save cost. In this case, each package would include a wireless power module and a radio module. An example of this microcontroller is shown in FIG. 2.

Electronic functions, capable of operating with interconnection circuit 116, may be added to or removed from the microcontroller at any time and in any number. To achieve this, the functions are placed within the range of interconnection circuit 116.

Circuit 116 is, for example, a Wi-Fi router.

Figure 3:
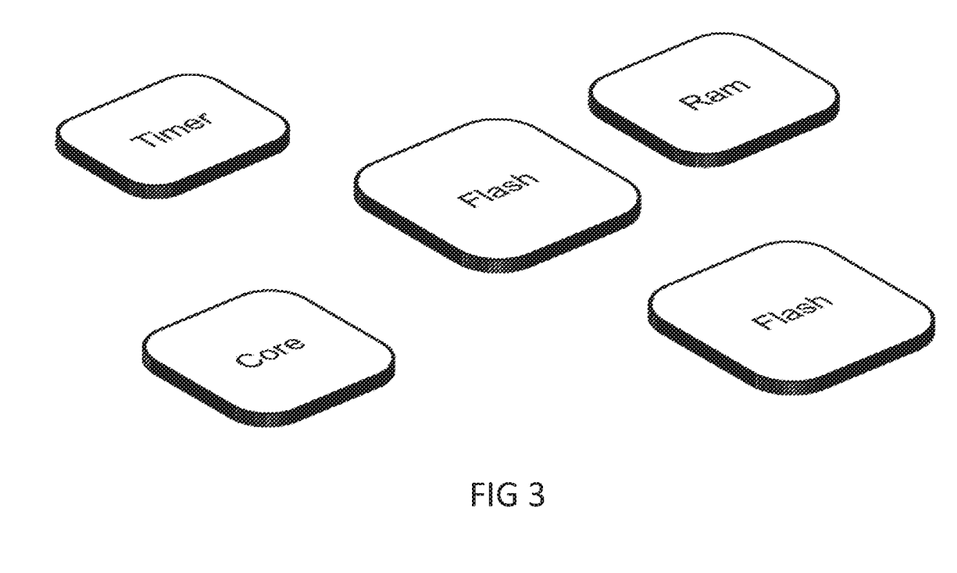
FIG. 3 illustrates in further detail a portion of the microcontroller of FIG. 1.

Another example of interconnection circuit 116 is described in relation with FIG. 3.

FIG. 3 illustrates in further detail a portion of the microcontroller of FIG. 1.

Circuit 116 (INTERCONNECT) comprises a central processing unit 202 (CPU) for example comprising logic circuits 204 (LOGIC) and a sequencer 205 (SEQUENCER), a memory 206 (MEM), a router 208 (ROUTER), and a radio frequency transmit/receive circuit 210 (RADIO).

Circuit 116 further comprises a power supply circuit, not shown, capable of being powered by wireless power supply circuit 110 (illustrated in FIG. 1).

Router 208 and transmit/receive circuit 210 enable to transmit data between the different functions of microcontroller 100.

In various embodiments, the sequencer 205 can be used to discover new components either to be added to or to be removed from the system. The memory 206 can be used to store characteristics of the components in the system, e.g., characteristics of RAM, ROM, peripherals and others. The router 208 can comprise a circuit that receives requests from CPU to read/write to RAM or peripherals and for all exchanges needed from the program to run. The control logic 204 can be used to select which CPU runs which program found on the different memories and to start and stop program execution in case a part of the system is not available.

The interconnect can be realized with an HW ad hoc (RTL) or with a microcontroller based system to deal with the most complex cases.

Figure 4:
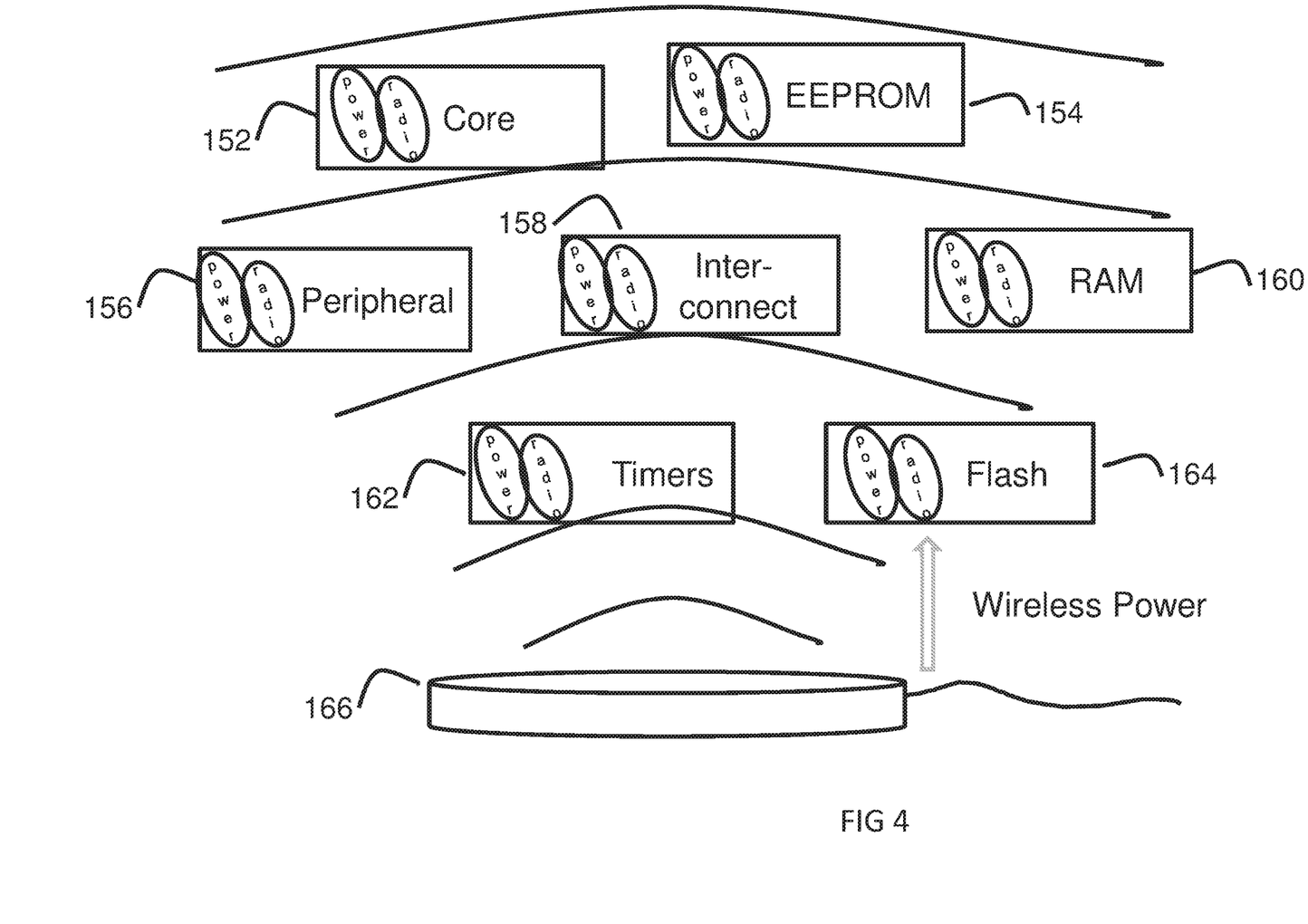
FIG. 4 schematically illustrates an embodiment of a microcontroller being powered.

FIG. 4 illustrates an example of the system being powered. Here a wireless power supply 166 is used to wirelessly power the functional circuits, which in the example include core 152, EEPROM 154, a peripheral 156, an interconnect 158, RAM 160, timers 162 and flash 164.

Figure 5:
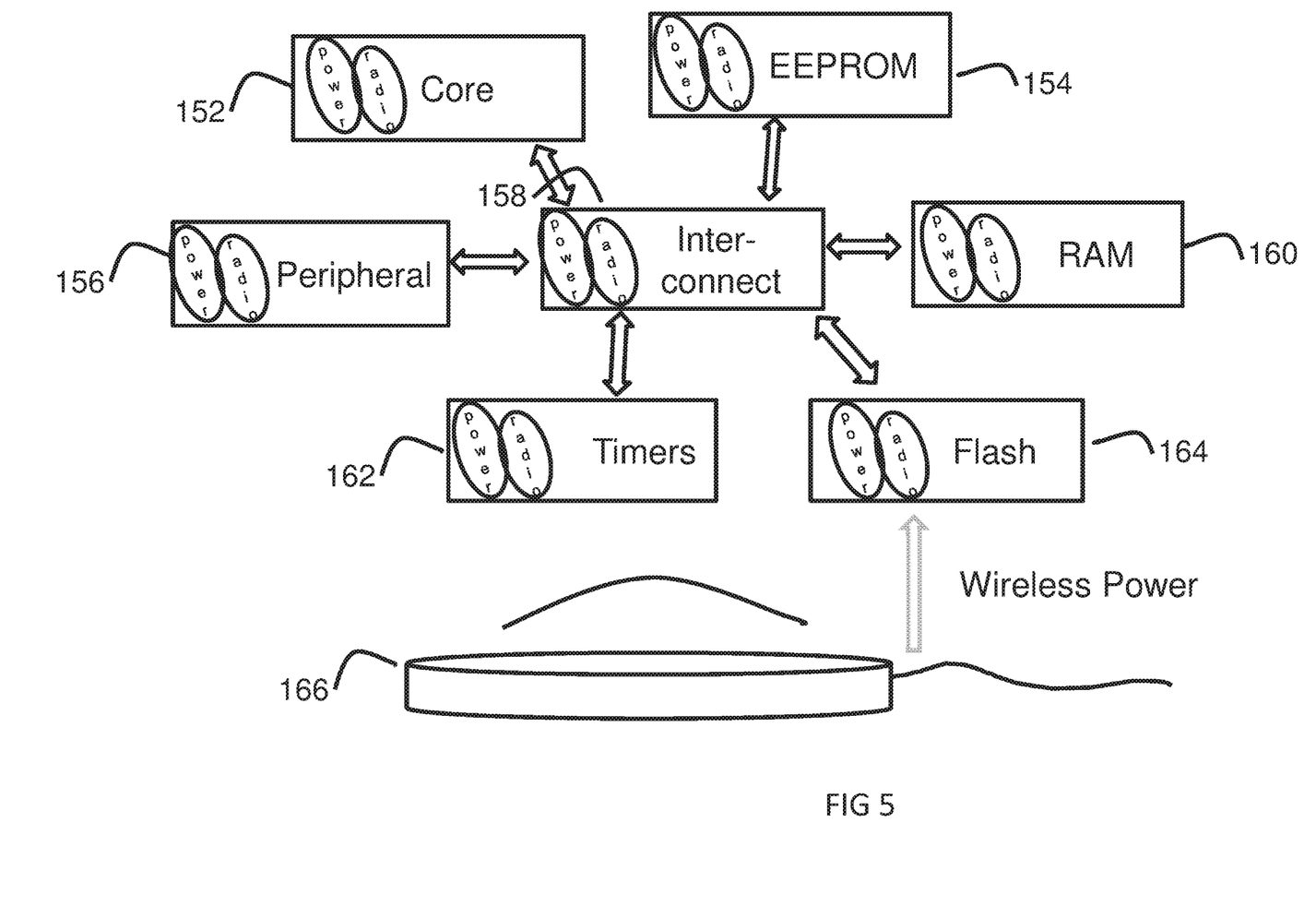
FIG. 5 schematically illustrates an embodiment of a microcontroller executing a program.

FIG. 5 illustrates the system of FIG. 4 during functional operation, e.g., when executing a program. As illustrated, the interconnect 158 can communicate with each of the other functions. While not necessary, the wireless charger can simultaneously provide power to the functions.

Figure 6:
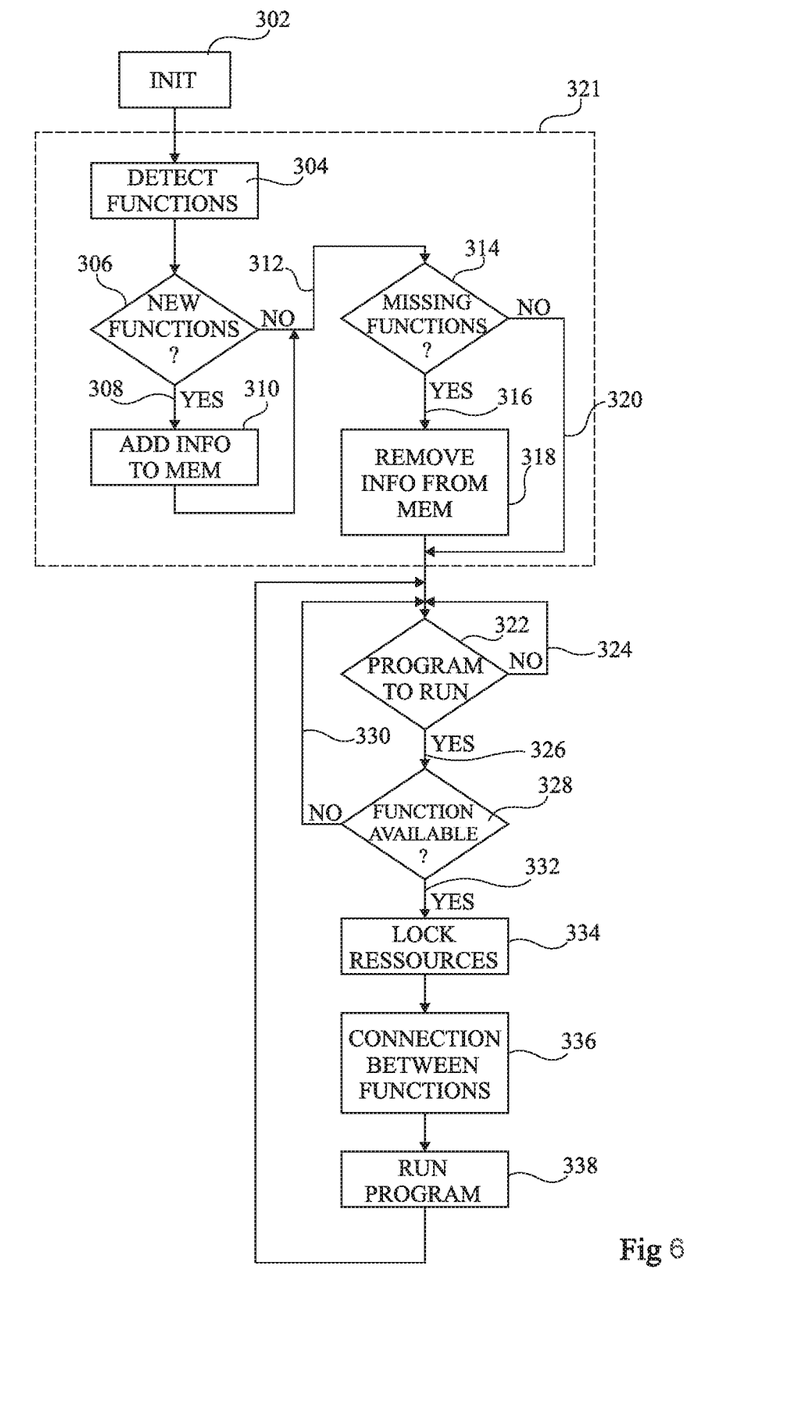
FIG. 6 illustrates a usage mode of the microcontroller of FIG. 1.

FIG. 6 illustrates a usage mode of the microcontroller of FIG. 1 comprising an interconnection circuit 116 such as described in relation with FIG. 3.

During a first step 302 (INIT), microcontroller 100 is initialized. The different electronic functions present are activated. In particular, power supply circuit 110 is set in operation, which enables to power the other functions. Further, the electronic functions and interconnection circuit 116 are initialized to be ready to operate.

During a step 304 (DETECT FUNCTIONS) subsequent to step 302, interconnection circuit 116 detects the electronic functions present, that is, available for microcontroller 100. Circuit 116 for example detects the electronic functions located within the range of circuit 116.

Circuit 116 then determines, at a step 306 (NEW FUCNTIONS?), whether electronic functions that it had not previously detected, that is, functions having configuration characteristics which are not contained in memory 206, are present. If this is true (branch 308, YES), circuit 116 records, in memory 206, the configuration characteristics of each new function. This corresponds to a step 310 (ADD INFO TO MEM). Configuration characteristics means the characteristics for example enabling to transmit the data, to determine the functions between which data should be transmitted, and to determine whether the functions which are present are sufficient to execute a given program.

For example, in the case where the function is a memory, circuit 116 for example records the type of memory (ROM, RAM, Flash, etc.), the memory size, certain specific addresses, the memory speed, etc. In the case of a memory comprising programs, for example, a non-volatile memory, circuit 116 records the number of programs contained in the memory and the resources, that is, the types and number of electronic functions, used for the execution of the program.

After step 310, as well as in the case where circuit 116 does not detect electronic functions that it had not previously detected (branch 312, NO), circuit 116 determines whether certain functions having their configuration characteristics contained in memory 206 are absent or inaccessible (step 314, MISSING FUNCTIONS?). If such is the case, that is, if some of these functions are no longer present (branch 316, YES), circuit 116 erases the characteristics corresponding to these functions from memory 206 (step 318, REMOVE INFO FROM MEM).

After step 318, as well as in the case where circuit 116 determines that all the functions having their configuration characteristics contained in memory 206 are present and accessible (branch 320, NO), circuit 116 proceeds to the next step (step 322).

As a variation, steps 314 and 318 may be carried out before steps 306 and 310 or may be carried out simultaneously.

Steps 304 to 318 form a set of steps 321. Steps 321 may be repeated during the operation of microcontroller 100. For example, steps 321 are periodically repeated, for example, with a period in the range from approximately 1 ms to approximately 10 s, for example, in the range from approximately 7.5 ms to approximately 4 s. Steps 321 are, for example, carried out before each step 322.

Next, circuit 116 determines whether programs attempt to be executed (step 322, PROGRAM TO RUN?), for example on instruction of a central processing unit. Program means any activity of microcontroller 100 where data are transmitted between different functions of the microcontroller. Circuit 116 may for example enable to simultaneously execute a plurality of programs.

If no program is to be executed (branch 324, NO), interconnection circuit 116 is in waiting mode. If at least one program is to be executed (branch 326, YES), circuit 116 determines, for example, via logic circuits 204, whether the functions used by this program are present and available (step 328, FUNCTIONS AVAILABLE?). For example, if the program comprises writing or reading data into or from a memory, the functions used are for example a central processing unit and a memory.

If at least one of these functions is not present or is not available (branch 330, NO), circuit 116 proceeds to another program and returns to step 322. If all the functions used by the program are present and available (branch 332, YES), the functions are locked (step 334, LOCK RESOURCES), for example, by logic circuits 204, that is, they are no longer available for other programs which may attempt to use them. As a variation, certain functions may be capable of executing more than one program at a time. Such functions are then considered to be unavailable when they simultaneously execute the maximum number of programs.

Once this step has been carried out, a wireless connection is established, via the transmit/receive circuit 210 and router 208, between the functions used by the program (step 336, CONNECTION BETWEEN FUNCTIONS) and the program is started (step 338, RUN PROGRAM), via logic circuits 204. After the starting of the program, circuit 116 determines whether another program should be executed (step 322).

If a function is removed, for example, if it is no longer within the range of circuit 116 or is turned off, the programs using this function are either redirected to another similar function, or made to wait, or stopped. The configuration characteristics of the programs may for example comprise instructions for such a case.

Figure 7:
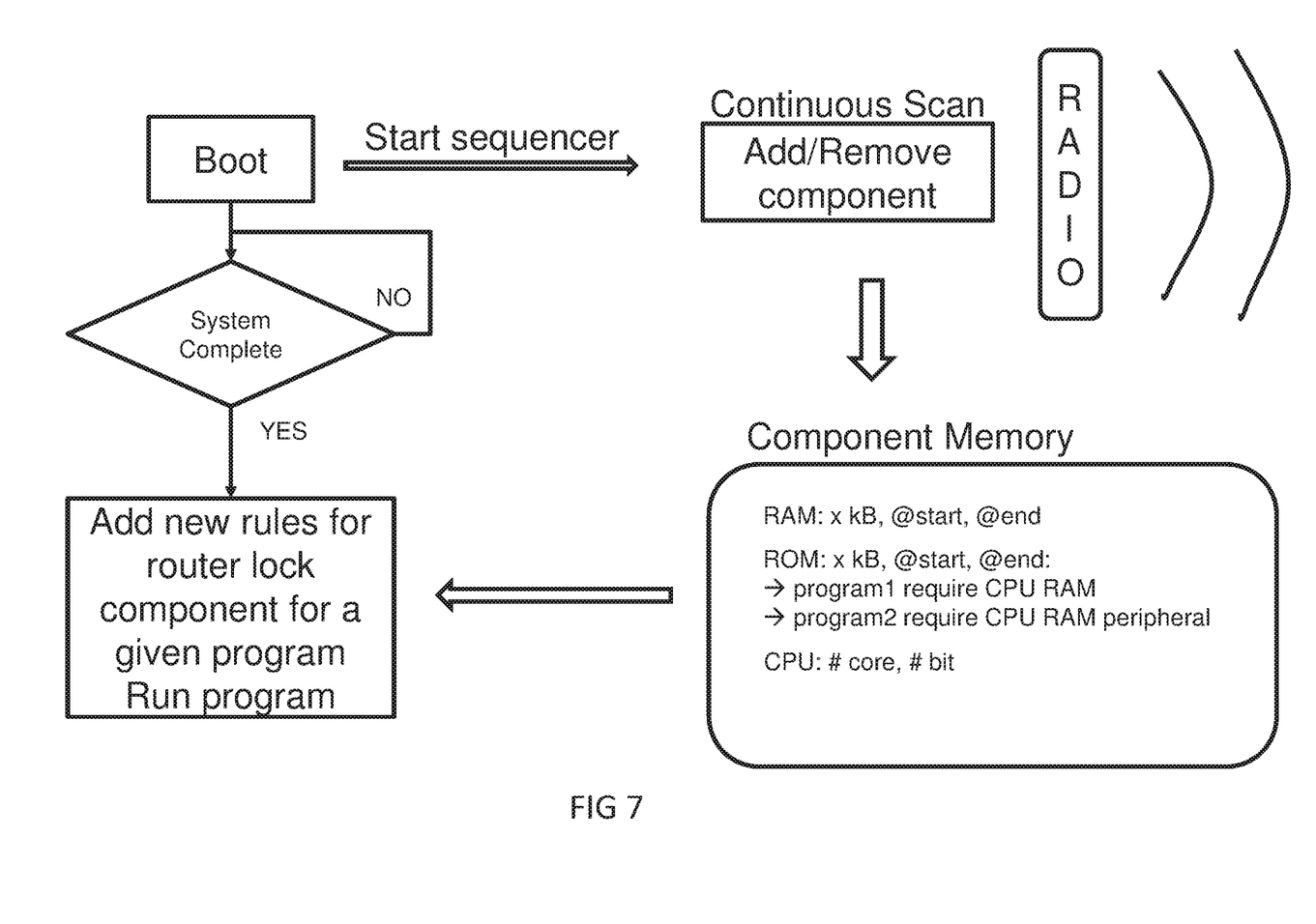
FIG. 7 provides another illustration of a usage mode.

FIG. 7 provides another representation of the operation of the system with reference to FIG. 3. After the boot, the interconnect starts to scan for components. When a component is found, characteristics of this component are added in the memory 206. For a RAM, for example, the system can store the amount of memory available, the speed, the number of bits and all the necessary information to operate the circuit. In case of ROM, the system could store the same information of the RAM but in addition the number of programs to be executed and which resources are needed for each program.

When the system includes at least one program contained in a ROM (or EPROM or equivalent), the control logic 204 will check if all the resources are available. These resources could include a CPU, a RAM and a peripheral, as examples. In the case where all the resources are available for example, the control logic will lock these resources and perhaps make them not available for other programs. In the case of a multitasking CPU, the resources can be shared between programs.

The control logic 204 will add some rules inside the router 208 in order to make a virtual connection between the selected resources. The control logic 204 will enable the selected CPU 202 to start the program. Requests from CPU 202 will pass through the router 208 and the router 208 will send the request to the external component, and vice versa in case of data from external component this will be routed to the right CPU. The exchange will be the same as in the case of a wired interconnection.

If a component is removed from the system, the corresponding characteristics will be removed from the component memory list. The program or the programs associated with this resource will be put in standby or canceled. If the control logic can find an equivalent resource it can decide to restart the program. This behavior can be put in the characteristic of the program itself and, for example, it could be auto start or wait for a program to start it. In this manner, an auto start program can be like an operating system that reboots in case of error or failure. Other programs can be run by a user just like an app in a smartphone or an installed program in computer system.

An advantage of the described embodiments is that it is possible to form a microcontroller having a number of functions which is not limited by the available space and the number of wire connections. It is thus possible to add, if need be, functions, for example, memories, central processing units, etc.

Another advantage of the described embodiments is that the components may be physically remote from one another. Performance limits are given only by the bandwidth of the interconnect and the wireless power.

Another advantage of the described embodiments is that it is no longer necessary to provide wire connections internal to the microcontroller, which causes a decrease in the manufacturing cost. In an example embodiment, no pins are needed for the core, the EEPROM, the RAM, flash or interconnect. In various embodiments, physical electrical connections would be used only with peripheral chips such as USB, Ethernet, keyboard, graphic card and the like.

Various embodiments with different variations have been described hereinabove. Other variations will occur to those skilled in the art. It should be noted that those skilled in the art may combine various elements of these various embodiments and variations.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A microcontroller comprising:
   a plurality of functional circuits comprising:
      a non-transitory memory storage comprising instructions, and
      a processor in communication with the non-transitory memory storage; and
   an interconnection circuit configured to wirelessly transmit data between each of the functional circuits, wherein the processor executes the instructions to:

determine a first subset of functional circuits configured to wirelessly communicate with the interconnection circuit, write, for each of the first subset of functional circuits, configuration characteristics into the non-transitory memory storage, erase, for each functional circuit precluded from the first subset of functional circuits, configuration characteristics from the non-transitory memory storage, and wirelessly transmit data between the interconnection circuit and each of the first subset of functional circuits.

2. The microcontroller of claim 1, wherein each of the first subset of functional circuits are not interconnected by a wire connection.

3. The microcontroller of claim 1, wherein at least one of the functional circuits comprises an input/output interface.

4. The microcontroller of claim 3, wherein the at least one of the input/output interface comprises wire connections for connection with peripherals.

5. The microcontroller of claim 1, wherein the interconnection circuit is a Wi-Fi router.

6. The microcontroller of claim 1, wherein the interconnection circuit comprises a router and a data transmit/receive circuit.

7. The microcontroller of claim 1, wherein each functional circuit comprises a data transmit/receive circuit.

8. The microcontroller of claim 1, wherein the processor executes the instructions to detect an addition or a removal of each functional circuit, respectively, to or from the microcontroller.

9. The microcontroller of claim 1, wherein the interconnection circuit and at least some of the functional circuits are wirelessly powered.

10. A method of operating a microcontroller, the method comprising:

determining electronic functional circuits that can wirelessly communicate with an interconnection circuit;

writing configuration characteristics into a memory of the interconnection circuit for electronic functional circuits that do not have configuration characteristics contained in the memory;

erasing configuration characteristics from the memory for electronic functional circuits that have configuration characteristics contained in the memory but are determined to not be able to wirelessly communicate with the interconnection circuit; and wirelessly transmitting data between the interconnection circuit and electronic functional circuits having configuration characteristics contained in the memory.

11. The method of claim 10, wherein each of the determining, the writing, and the erasing is periodically carried out during an operation of the microcontroller.

12. The method of claim 11, wherein a period corresponding to the operation of the microcontroller is in a range between approximately 1 milliseconds and approximately 10 seconds.

13. The method of claim 10, further comprising:
determining a program to be executed;
determining the electronic functional circuits used by the program; and
determining whether the electronic functional circuits used by the program are able to wirelessly communicate with the interconnection circuit, and, based thereon:

establishing a wireless connection between the electronic functional circuits wirelessly able to communicate with the interconnection circuit, and
executing the program.

14. The method of claim 13, further comprising excluding access by other programs to electronic functional circuits used by the program.

15. A computing system comprising:
a first functional circuit, a second functional circuit, an interconnection circuit, a processor circuit, and a non-transitory memory storage, wherein each of the first functional circuit, the interconnection circuit, the processor circuit and a non-transitory memory storage comprises a distinct wireless communication circuit and a distinct wireless charging circuit, the second functional circuit comprising external conductive contacts, wherein the non-transitory memory storage further comprises instructions, that when executed by the processor circuit, cause the processor circuit to perform the steps of:

determining that the first functional circuit is configured for a wireless communication with the interconnect circuit, and, based thereon, writing configuration characteristics for the first functional circuit into the non-transitory memory storage;

determining that the second functional circuit is configured for a wired communication with the interconnection circuit; and wirelessly transmitting data between the interconnection circuit and the first functional circuit.

16. The computing system of claim 15, wherein the interconnection circuit comprises a central processing unit, a router, a memory circuit, and a data transmit/receive circuit.

17. The computing system of claim 15, wherein the second functional circuit is configured to communicate with the interconnection circuit using the external conductive contacts.

18. The computing system of claim 17, further comprising a peripheral device electrically coupled to the external conductive contacts of the second functional circuit.

19. The computing system of claim 15, wherein the non-transitory memory storage comprises further instructions, that when executed by the processor circuit, cause the processor circuit to perform the step of:
erasing configuration characteristics from the non-transitory memory storage for the second functional circuit.

20. The computing system of claim 15, wherein the non-transitory memory storage comprises further instructions, that when executed by the processor circuit, cause the processor circuit to perform the steps of:
determining a program to be executed;
determining that the first functional circuit comprises function circuits used by the program;
determining that the first functional circuit is configured to wirelessly communicate with the interconnection circuit;
establishing a wireless connection between the first functional circuit and the interconnection circuit; and
executing the program.

21. The computing system of claim 15, wherein each of the first functional circuit, the second functional circuit, the interconnection circuit, the processor circuit, and the non-transitory memory storage is a separately packaged semiconductor chip.

* * * * *